(12) United States Patent
Haldemann

(10) Patent No.: US 7,459,825 B2
(45) Date of Patent: Dec. 2, 2008

(54) STATOR WINDING ROD

(75) Inventor: Johann Haldemann, Birr (CH)

(73) Assignee: Alstom Technology Ltd, Baden (CH)

( * ) Notice: Subject to any disclaimer, the term of this patent is extended or adjusted under 35 U.S.C. 154(b) by 91 days.

(21) Appl. No.: 11/386,284

(22) Filed: Mar. 22, 2006

(65) Prior Publication Data

US 2007/0222321 A1    Sep. 27, 2007

(30) Foreign Application Priority Data

Mar. 23, 2005   (CH) .................................... 0505/05

(51) Int. Cl.
    *H02K 3/14*   (2006.01)
(52) U.S. Cl. .......................... 310/213; 310/201; 174/33
(58) Field of Classification Search ................. 310/213, 310/201, 179; 174/33–34
    See application file for complete search history.

(56) References Cited

U.S. PATENT DOCUMENTS

| | | | | |
|---|---|---|---|---|
| 2,821,641 A | | 1/1958 | Ringland | ................... 310/213 |
| 3,585,428 A | * | 6/1971 | Bennington et al. | ......... 310/213 |
| 3,614,497 A | * | 10/1971 | Brenner | ...................... 310/213 |
| 4,307,313 A | * | 12/1981 | Rohrer | ....................... 310/213 |
| 2002/0063489 A1 | * | 5/2002 | Haldemann | ................. 310/179 |
| 2007/0222321 A1 | * | 9/2007 | Haldemann | ................. 310/213 |

OTHER PUBLICATIONS

International Search Report for CH 00505/05 (2 pages) and brief translation thereof (1 page).
P. Bapat: "Das Entstehen der Schlingstromverluste in elektrischen Maschinen und Massnahmen zu ihrer Verringerung", Technische Mitteilungen AEG-Telefunken Aktiengesellschaft, Frankfurt, vol. 63, No. 1, Jan. 1973, XP002029109, pp. 18-23 (see translation of International Search Report).

* cited by examiner

*Primary Examiner*—Burton Mullins
(74) *Attorney, Agent, or Firm*—Darby & Darby

(57) ABSTRACT

A stator winding bar comprises a plurality of strands that are transposed in the manner of a Roebel bar in an active part having a prescribed length, the active part being divided into several areas having different lengths arranged one after the other, in each area a transposition of the strands by a prescribed angle magnitude is provided, wherein the crimping distance within each area varies.

7 Claims, 3 Drawing Sheets

STATOR WINDING ROD

Priority is claimed to Swiss Patent Application No. CH 00505/05, filed on Mar. 23, 2005, the entire disclosure of which is incorporated by reference herein.

The present invention relates generally to the field of dynamoelectric machines and, in particular, to a stator winding bar having a plurality of strands that are transposed in the manner of a Roebel bar in an active part having a prescribed length

BACKGROUND

In the case of stator windings of dynamoelectric machines such as, for example, turbogenerators, stator winding bars are used that are placed into appropriate grooves in the stator and affixed there. In order to reduce eddy currents, the stator winding bars consist of a plurality of insulated strands that (as shown in FIG. 5) are combined to form stacks 26, 27 arranged in parallel and that are then surrounded by an outer insulation. In order to reduce circulating current losses in the strands, the strands are transposed (Roebel transposition) according to a prescribed pattern (magnitude of the angle) within the active length (in the active part) of the stator winding bar. A stator winding bar formed in this manner is referred to as a Roebel bar.

A standard transposition of the kind known from U.S. Pat. No. 2,821,641 is shown schematically in FIG. 1. The stator winding bar 10 shown in FIG. 1 comprises two stacks, each with ten strands 11. In order to clearly depict the transposition, a strand—designated with the reference numeral 12—is drawn with thicker lines. The stator winding bar 10 is supported with an active part 8 having a length L in a winding groove (not shown here) of the stator. The strands execute a transposition of 540° over the length L of the active part 8, that is to say, each strand has completed a rotation of 540° around the longitudinal axis of the bar in this area. The stack change of the strands 11 needed for the transposition is made possible by appropriately crimping the strands. The transposition per unit of length of the stator winding bar can be larger or smaller. If the transposition per unit of length increases, the crimping distance k decreases (FIG. 1), that is to say, the distance between the crimping sites of strands that are adjacent in the stack. The active part 8 is delineated on both sides by winding heads 9 in which the strands 11 are untwisted.

With the known stator winding bar 10 from FIG. 1, the active part 8 is divided into three areas A, B and C in each of which a transposition by 180° is provided, resulting in a transposition of 3×180°=540° over the entire length L of the active part 8. The two outer areas A and C are the same length and they each extend over one-fourth of the length L of the active part 8. The middle area B extends accordingly over half the length L/2 of the active part.

In the transposition shown in FIG. 1, due to the non-transposed bar parts in the winding head, unequal current distributions still nevertheless occur in the strands, since circular currents (also called circulating currents), which are caused by the magnetic field in the winding head, form in the loops formed by strands and the ears at the ends of the bars. Thus, U.S. Pat. No. 3,614,497 already proposed compensating for the effects of the non-transposed bar parts in the winding head by incorporating so-called voids (that is to say, non-transposed areas). The appertaining transposition diagram is shown in FIG. 2.

The stator winding bar 13 shown there, which again consists of two stacks, each with ten strands 14 and 15, is once again divided over the length L of the active part 8 into the three areas A, B and C in each of which a transposition of 180° is provided. In this case, once again, the lengths of the areas A, B and C amount to L/4, L/2 and L/4. Unlike the solution shown in FIG. 1, however, a segment 16, 17, 18 is inserted in the middle of each area, no transposition occurring in said segments 16, 17, 18. The crimping distance k is correspondingly shortened in the other segments of the areas A, B and C.

The introduction of the voids or non-transposed segments 16, 17 and 18 brings about a reduction in the undesired circulating current effects, but it does not totally eliminate them.

SUMMARY OF THE INVENTION

An object of the present invention is to provide a transposed stator winding bar with which the circulating current losses in the bar can be greatly reduced in comparison to the solutions known from the state of the art.

The present invention provides a stator winding bar that includes a plurality of strands transposed in the manner of a Roebel bar in an active part having a prescribed length, the active part being divided into several areas having different lengths and arranged one after the other, in each of which areas a transposition of the strands by a prescribed angle magnitude is provided, characterized in that the crimping distance varies in each of the areas of the active part.

One embodiment of the invention is characterized in that a transposition totaling 540° is provided in the active part. The active part is divided into three areas, a transposition of 180° being present in each area. The middle area extends over half of the length of the active part, whereas the two other areas each extend over one-fourth of the length of the active part. Each area is divided into several segments arranged one after the other and the crimping distance is constant in each of the segments.

In particular, each area is divided into three segments arranged one after the other, with the crimping distance over the two outer segments of each area being equal to or smaller than the crimping distance over each middle segment. Within each area, the segments each have the same length, the segments of the middle area each being twice as long as the segments of the two outer areas.

BRIEF DESCRIPTION OF THE FIGURES

The invention will be explained in greater detail below with reference to embodiments in conjunction with the drawing, which shows the following.

DETAILED DESCRIPTION

The above-mentioned U.S. Pat. No. 3,614,497 proposes a transposition of 540° in the active part of the stator winding bars of rotary current windings, namely, with the additional insertion of so-called voids in order to compensate for the effects of the non-transposed parts of the bar in the winding head, and it is on this basis that the present invention achieves an improved transposition effect.

A feature of the invention is that the transposition of 540° in the active part is not effectuated through voids but rather through various tightly crimped segments that make it possible to reduce the so-called circulating current losses in comparison to the approach from the above-mentioned publication. Another advantage is that the stator winding bar does not have any non-transposed segments which, for production-related reasons, are undesired because of the divergent bar height (compared to segments of crimped strands).

Figure 1:
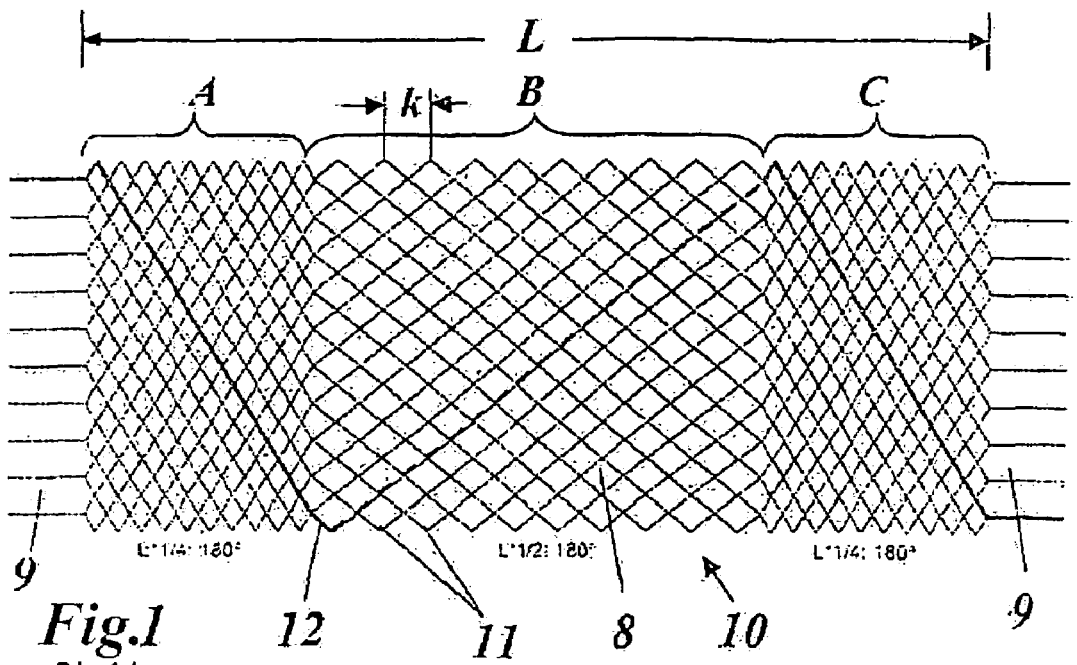
FIG. 1 a transposition diagram known from the state of the art with three areas of different lengths in which a uniform transposition of 180° is provided in each area.
Figure 2:
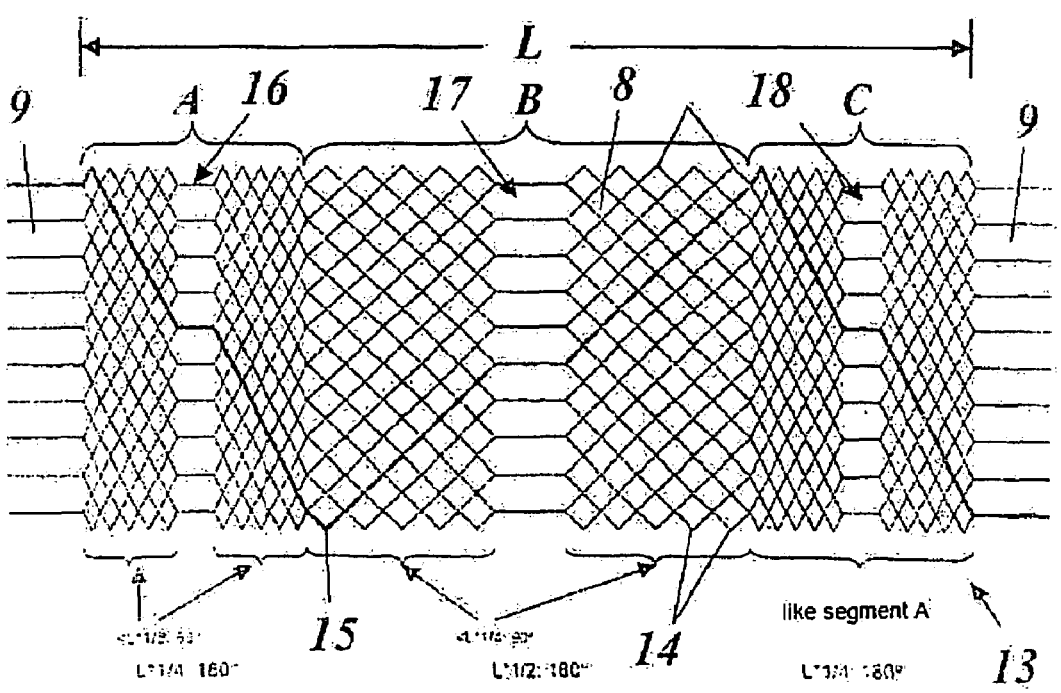
FIG. 2 in a depiction comparable to FIG. 1, another transposition diagram known from the state of the art, in which voids without transposition have been inserted into each of the areas.
Figure 3:
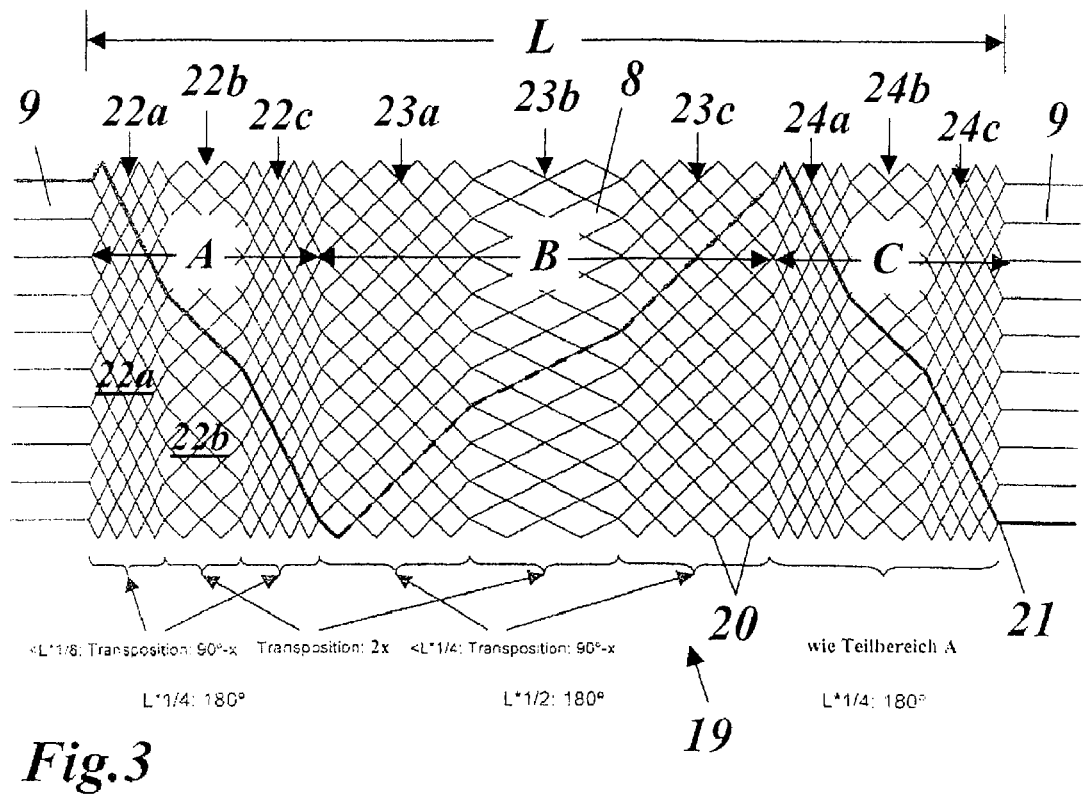
FIG. 3 in a depiction comparable to FIG. 1, a transposition diagram according to an embodiment of the invention.

FIG. 3 shows an embodiment of the transposition according to the invention that is comparable to FIGS. 1 and 2, in which here as well, a stator winding bar 19 has been taken as the basis that consists of two stacks, each with ten strands 20, 21. Here, too, three areas A, B and C are present having the lengths L/4, L/2 and L/4 in each of which the transposition is 180°. Like with the standard 540° transposition (FIG. 1), the two outer areas A and C having the length L/4 are structured identically and transposed in the same manner. The middle area B of the transposition according to the invention is structured analogously to the outer areas A and C but, in comparison to each of these areas A or C, extends over twice the length L/2.

When the stator winding bar is manufactured, the crimping sites arranged in the middle of the individual areas A, B and C are pulled apart. This creates larger crimping distances k in the corresponding segments 22b, 23b and 24b than in the standard 540° transposition of FIG. 1. Moreover, at the edges of the areas (segments 22a,c, 23a,c and 24a,c), the crimping distances are shorter than with the standard 540° transposition. Consequently, the areas A, B and C each have at least two different crimping distances k. Within the scope of the invention, however, more than two different crimping distances can be realized. Hence, a continuous change in the crimping distances can be achieved and the circulating current factor can be further minimized. However, this does not go as far as in the case of FIG. 2, where an entire area is not transposed at all. Since these different crimping distances look like the bellows of an accordion, this type of transposition could be called "540° accordion-transposition".

As shown in FIG. 3, the segments 22a,b,c; 23a,b,c; and 24a,b,c each have the same length, and each segment 23a,b,c of the middle area B is twice as long as the corresponding segments 22a,b,c and 24a,b,c of the two outer areas A, C.

Figure 4:
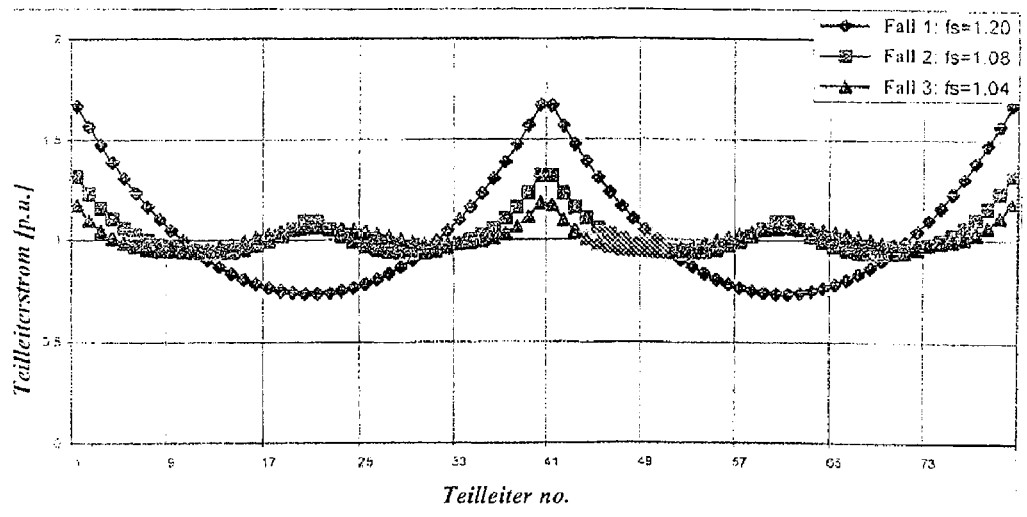
FIG. 4 a comparative calculation of the current distribution in a stator winding bar with 80 strands according to the configuration shown in FIG. 5 for the three transposition diagrams of FIGS. 1 to 3.
Figure 5:
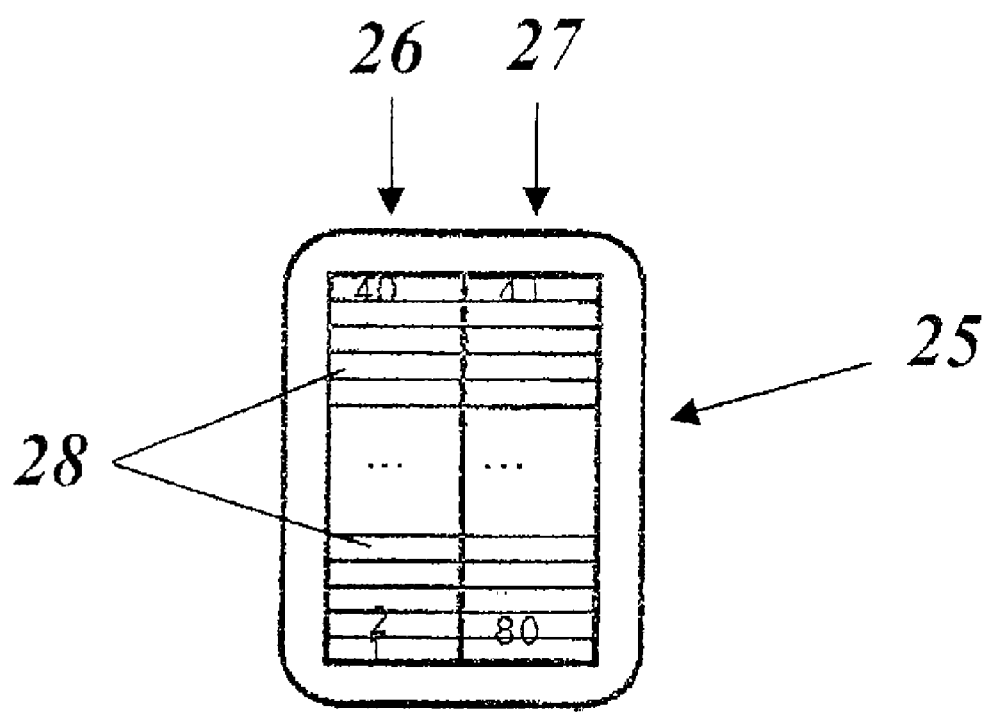
FIG. 5 the structure of the stator winding bar upon which the calculation of FIG. 4 is based, with the applicable numbering of the strands.

FIG. 4 shows results of the current distribution—calculated for a turbogenerator—in the individual strands (strand current in p.u. over the number of strands, that is to say, per value of the strand current without circulating current), which illustrate the above-mentioned effects. According to FIG. 5, the stator winding bars 25 upon which the calculations are based consist of two stacks 26, 27, each with forty strands 28, which have an insulated height of 2.2 mm. The calculation of the circulating current factor for the well-known standard transposition of 540° (FIG. 1, case 1) yields a value of 1.20 (circulating current losses relative to the purely ohmic losses).

A circulating current factor of 1.08 is obtained for FIG. 2 (case 2), and a circulating current factor of 1.04 for the transposition according to FIG. 3 (case 3) upon which the invention is based.

It should be taken into consideration that the stator winding bar transposition that needs to be used to attain the minimum circulating current factor cannot be specified precisely in advance since the increase in the crimping distances has to be carried out differently, depending on the machinery, and moreover, the minimum permissible crimping distances have to be taken into account.

The invention claimed is:

1. A stator winding bar, comprising:
   a plurality of strands disposed in an active part having a prescribed overall length and divided into a plurality of areas arranged one after the other, each area having a different area length than that of an adjacent area and each area being divided into at least three segments arranged one after another; and
   wherein the plurality of strands is transposed in the manner of a Roebel bar within the active part such that a transposition of the strands by a prescribed angle magnitude in each area is provided, each strand including at least one crimping site in each area and each segment including at least two adjacent crimping sites of adjacent strands, wherein a crimping distance between two adjacent crimping sites of adjacent strands in one segment of each area differs from the crimping distance between two adjacent crimping sites of adjacent strands in at least one of the other segments of the respective area.

2. The stator winding bar as recited in claim 1, wherein the plurality of areas includes three areas, wherein the prescribed angle magnitude is 180°, wherein an overall transposition in the active part is 540°.

3. The stator winding bar as recited in claim 2, wherein a middle area extends over half the overall length of the active part and the two other areas each extend over one-fourth of the overall length of the active part.

4. The stator winding bar as recited in claim 1, wherein the crimping distance within each segment is constant.

5. The stator winding bar as recited in claim 1, wherein each area includes a middle segment and two outer segments and wherein the crimping distance over the two outer segments in each area is the same and is smaller than the crimping distance over the middle segment in the respective area.

6. The stator winding bar as recited in claim 4, wherein the segments within each area have the same length.

7. The stator winding bar as recited in claim 6, wherein the plurality of areas includes a middle area and two outer areas and wherein the segments of the middle area are each twice as long as the segments of the two outer areas.

* * * * *